United States Patent
Choi (10) Patent No.: US 10,125,704 B2
(45) Date of Patent: *Nov. 13, 2018

(54) ENGINE SYSTEM HAVING EGR APPARATUS

(71) Applicant: Hyundai Motor Company, Seoul (KR)

(72) Inventor: Choo Saeng Choi, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,514

(22) Filed: Dec. 12, 2016

(65) Prior Publication Data

US 2018/0058351 A1    Mar. 1, 2018

(30) Foreign Application Priority Data

Aug. 24, 2016  (KR) ........................ 10-2016-0107727

(51) Int. Cl.
*F02B 33/44* (2006.01)
*F02D 41/00* (2006.01)
(Continued)

(52) U.S. Cl.
CPC .......... *F02D 41/0077* (2013.01); *F02B 33/40* (2013.01); *F02B 37/20* (2013.01);
(Continued)

(58) Field of Classification Search
CPC ........ F02M 26/04; F02M 26/05; F02M 26/06; F02M 26/14; F02M 26/47
(Continued)

(56) References Cited

U.S. PATENT DOCUMENTS

| 7,693,645 | B2 * | 4/2010 | Nam ................... F02D 41/0052 |
| | | | 123/568.21 |
| 2009/0277431 | A1 * | 11/2009 | Nitzke ..................... F02D 9/04 |
| | | | 123/568.12 |

(Continued)

FOREIGN PATENT DOCUMENTS

| JP | 2001-003817 A | 1/2001 |
| JP | 2003-239811 A | 8/2003 |

(Continued)

*Primary Examiner* — Ngoc T Nguyen
(74) *Attorney, Agent, or Firm* — Morgan, Lewis & Bockius LLP (57) ABSTRACT

An engine system having an ERG apparatus may include an engine including a plurality of combustion chambers generating a driving torque by combustion of a fuel; an intake line inflowing an intake gas supplied to the combustion chamber; an exhaust line flowing an exhaust gas exhausted from the combustion chamber; a turbocharger including a turbine provided at the exhaust line and rotated by the exhaust gas exhausted from the combustion chamber and a compressor provided at the intake line, rotated in connection with the turbine, and compressing external air; and an EGR apparatus including a recirculation line branched from the exhaust line and joined to the intake line, a flow rate controller mounted at the recirculation line and measuring and controlling an amount of recirculation gas, and a pressure sensor mounted at the recirculation line to measure a pressure of the recirculation gas.

9 Claims, 4 Drawing Sheets

(51) Int. Cl.
*F02B 33/40* (2006.01)
*F02B 37/20* (2006.01)
*F02M 26/04* (2016.01)
*F02M 26/20* (2016.01)
*F02M 26/14* (2016.01)
*F02M 26/47* (2016.01)

(52) U.S. Cl.
CPC ............ *F02M 26/04* (2016.02); *F02M 26/14* (2016.02); *F02M 26/20* (2016.02); *F02M 26/47* (2016.02); *F02D 2200/50* (2013.01)

(58) Field of Classification Search
USPC .................................... 123/568.11; 60/605.2
See application file for complete search history.

(56) References Cited

U.S. PATENT DOCUMENTS

| | | | | |
|---|---|---|---|---|
| 2012/0312001 | A1* | 12/2012 | Nam | F02D 41/0072 60/299 |
| 2012/0312283 | A1* | 12/2012 | Nam | F02D 41/0065 123/568.11 |
| 2013/0074494 | A1* | 3/2013 | Chi | F02D 41/0072 60/605.2 |
| 2014/0373814 | A1* | 12/2014 | Herold | F02D 41/0007 123/51 B |
| 2015/0192087 | A1* | 7/2015 | Shirahashi | F02D 41/405 701/104 |
| 2015/0233326 | A1* | 8/2015 | Takaki | F02M 25/072 123/559.2 |
| 2016/0069300 | A1* | 3/2016 | Minamoto | F02D 41/0065 123/568.11 |
| 2016/0076467 | A1* | 3/2016 | Prumm | F02D 41/0072 123/568.11 |

FOREIGN PATENT DOCUMENTS

| | | |
|---|---|---|
| JP | 2009-513875 A | 4/2009 |
| JP | 5043899 B2 | 10/2012 |
| JP | 5518234 B1 | 6/2014 |
| JP | 2014-122575 A | 7/2014 |
| KR | 10-2012-0059928 A | 6/2012 |

* cited by examiner

ENGINE SYSTEM HAVING EGR APPARATUS

CROSS-REFERENCE TO RELATED APPLICATION

The present application claims priority to and the benefit of Korean Patent Application No. 10-2016-0107727 filed on Aug. 24, 2016, the entire contents of which are incorporated herein by reference.

BACKGROUND OF THE INVENTION

Field of the Invention

The present invention relates to an engine system having an EGR apparatus. More particularly, the present invention relates to an engine system having an EGR apparatus correctly measuring and controlling a recirculation gas flow rate.

Description of Related Art

An engine of a vehicle combusts a mixture of air inflowing from the outside and a fuel with an appropriate ratio to generate power.

In a process of generating power by driving the engine, the external air for the combustion must be appropriately supplied to obtain a desired output and combustion efficiency. For this, a turbocharger as a device for turbocharging the air for the combustion to increase the combustion efficiency of the engine is used.

In general, a turbocharger is a device that rotates a turbine by using pressure of exhaust gas discharged from an engine and thereby increases output of the engine by supplying high-pressure air to a combustion chamber by using rotational force thereof. The turbocharger is applied to both a diesel engine and a gasoline engine.

Further, a nitrogen oxide (NOx) included in the exhaust gas is regulated as an atmospheric pollution source and there has been an effort to lessen exhaust of NOx.

An exhaust gas recirculation (EGR) system has been provided to a vehicle for reducing noxious exhaust gas. Generally, NOx is increased in a case where an air-fuel ratio of an air-fuel mixture is high, which is necessary for sufficient combustion. Thus, the exhaust gas recirculation system mixes exhaust gas from an engine with the air-fuel mixture, for example at 5-20%, thereby reducing the amount of oxygen in the air-fuel mixture and obstructing combustion, and so lessening generation of NOx.

The exhaust gas recirculation (EGR) system of the gasoline engine is a system mounted to the vehicle for fuel consumption improvement. A pumping loss may be reduced in a low speed/low load situation through the exhaust gas recirculation system and ignition timing may be advanced because of a temperature reduction of a combustion chamber, thereby improving the fuel consumption of the vehicle.

As a representative exhaust gas recirculation system, there is a low pressure exhaust gas recirculation (LP-EGR) device. The LP-EGR device recirculates the exhaust gas passing through a turbine of the turbocharger into an intake pathway of a front stage of a compressor.

The exhaust gas recirculation system according to a conventional art supplies the recirculation gas to the combustion chamber of the engine by a torque of the turbine and the compressor when the turbocharger is operating.

However, when the turbocharger is not operating, since almost no negative pressure is generated at the front stage of the compressor, use of a separate differential pressure generation valve is considered. However, if the differential pressure generation valve is mounted, manufacturing cost of the vehicle is increased.

Also, when a differential pressure sensor detecting a pressure difference between a front stage and a rear stage of the EGR valve controlling the amount of the recirculation gas is mounted, since the pressure difference between the front stage and the rear stage of the EGR valve is small in the low speed/low load region, precision of the EGR control decreases.

Accordingly, since the correct amount of recirculation gas may not be controlled, combustion stability may not be obtained such that the ignition timing may not be advanced and it is difficult to improve the fuel consumption of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system having an EGR apparatus correctly controlling the amount of the recirculation gas without separately using the differential pressure sensor and the EGR valve.

Further, various aspects of the present invention are directed to providing an engine system having an ERG apparatus improving the combustion stability and the fuel consumption of the vehicle through control of the amount of the recirculation gas.

An engine system having an ERG apparatus according to an exemplary embodiment of the present invention includes: an engine including a plurality of combustion chambers generating a driving torque by combustion of a fuel; an intake line inflowing an intake gas supplied to the combustion chamber; an exhaust line flowing an exhaust gas exhausted from the combustion chamber; a turbocharger including a turbine provided at the exhaust line and rotated by the exhaust gas exhausted from the combustion chamber and a compressor provided at the intake line, rotated in connection with the turbine, and compressing external air; and an EGR apparatus including a recirculation line branched from the exhaust line and joined to the intake line, a flow rate controller mounted at the recirculation line and measuring and controlling an amount of recirculation gas, and a pressure sensor mounted at the recirculation line to measure a pressure of the recirculation gas.

The flow rate controller may include: a drive motor generating power; a flap mounted at a rotation axis of the drive motor and rotated by the recirculation gas flowing in the recirculation line or by the power of the drive motor; and a speed sensor detecting a rotation speed of the flap.

The flap may be provided perpendicular to a flow direction of the recirculation gas flowing in the recirculation line.

The rotation axis of the drive motor may be positioned outside a radial direction of an interior circumference of the recirculation line.

An operation information detector detecting operation information of the vehicle, and a controller controlling the flow rate controller depending on the operation information, may be further included.

The controller may control the flap to be rotated in a direction opposite to the flow direction of the recirculation gas flowing in the recirculation line when it is determined that the operation region is not the use region that the EGR apparatus is not used from the operation information.

The controller may determine an amount of the recirculation gas from the pressure of the recirculation gas measured by the pressure sensor and the rotation speed of the flap determined by the speed sensor, and may control the flap to be rotated in a same direction as the flow direction of the recirculation gas flowing in the recirculation line depending on the determined amount of the recirculation gas and a target EGR ratio when it is determined that the operation region is the use region that the EGR apparatus is used from the operation information.

A humidity sensor measuring humidity of fresh air flowing in the intake line may be further included, and the controller may compensate a rotation speed of the flap depending on the humidity of the fresh air measured by the humidity sensor.

A method for controlling the engine system of the engine and an EGR apparatus re-supplying a part of exhaust gas exhausted from the engine to a combustion chamber of the engine according to another exemplary embodiment of the present invention includes: detecting operation information from an operation information detector; determining whether an operation of the vehicle is a use region that an EGR apparatus is used from the operation information by a controller; and controlling operation of a flow rate controller of the EGR apparatus depending on the use region of the EGR apparatus by the controller.

When the operation region is the use region that the EGR apparatus is used, the controlling step includes: measuring pressure of an exhaust gas flowing in the recirculation line by a pressure sensor provided in a recirculation line of the EGR apparatus; measuring a rotation speed of a flap mounted at a rotation axis of a drive motor of the flow rate controller by a speed sensor; determining an amount of recirculation gas from the pressure of the exhaust gas and the rotation speed of the flap by the controller; and controlling the flap to be rotated in a same direction as the flow direction of the exhaust gas flowing in the recirculation line depending on the amount of recirculation gas and the target EGR ratio by the controller.

When the operation region is not the use region that the EGR apparatus is not used, the controlling includes: measuring a pressure of exhaust gas flowing in the recirculation line by a pressure sensor provided to the recirculation line of the EGR apparatus; measuring a rotation speed of a flap mounted at a rotation axis of a drive motor of the flow rate controller by a speed sensor; determining an amount of recirculation gas from the pressure of the exhaust gas and the rotation speed of the flap by the controller; and controlling the flap mounted at the rotation axis of the drive motor of the flow rate controller to be rotated in a direction opposite to the flow direction of the exhaust gas flowing in the recirculation line depending on the amount of the recirculation gas by the controller.

According to the engine system having the ERG apparatus according to an exemplary embodiment of the present invention, the amount of recirculation gas may be correctly measured and controlled through the flow rate controller provided at the recirculation line.

Also, combustion stability may be obtained and fuel consumption may be improved by the correct control of the recirculation gas amount.

Further, an additional differential pressure generation valve, differential pressure sensor, and EGR valve may be omitted such that a manufacturing coat of the vehicle may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify the present invention, parts that are not connected with the description will be omitted, and the same elements or equivalents are referred to by the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

Now, an engine system having an ERG apparatus according to an exemplary embodiment of the present invention will be described with reference to accompanying drawings.

Figure 1:
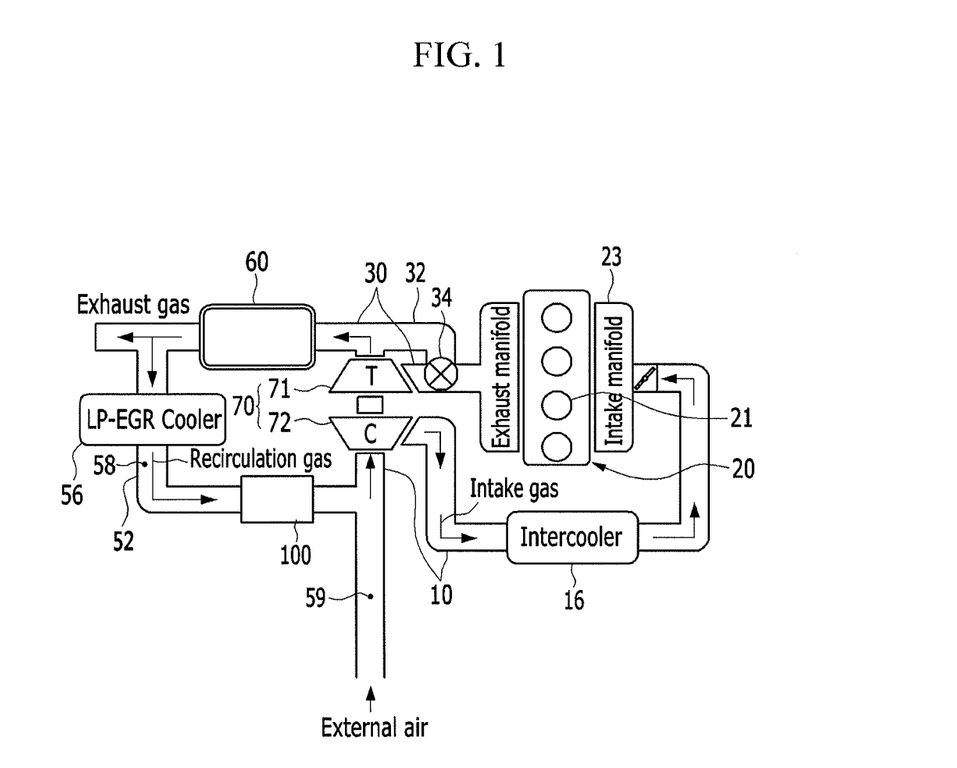
FIG. 1 is a schematic view showing a configuration of an engine system having an ERG apparatus according to an exemplary embodiment of the present invention.
Figure 2:
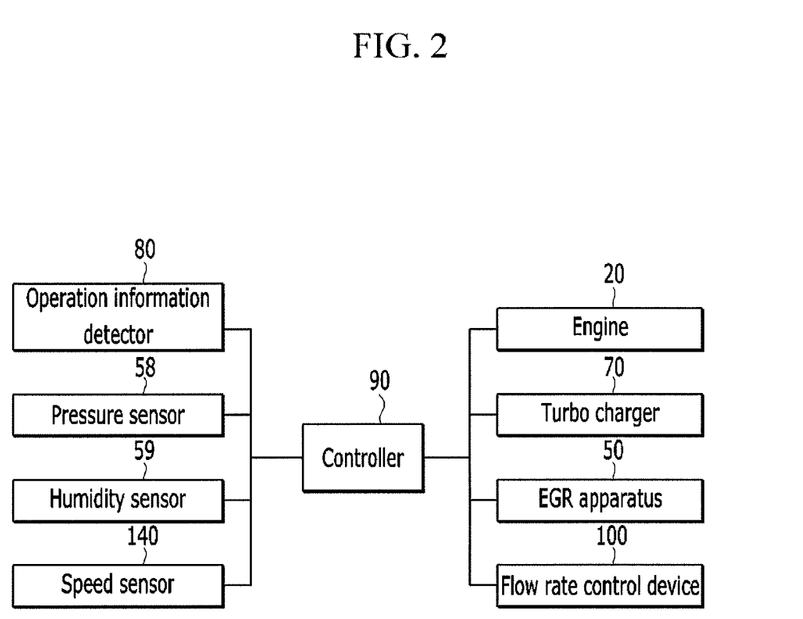
FIG. 2 is a block diagram showing a configuration of an engine system having an ERG apparatus according to an exemplary embodiment of the present invention.

FIG. 1 is a schematic view showing a configuration of an engine system having an ERG apparatus according to an exemplary embodiment of the present invention. FIG. 2 is a block diagram showing a configuration of an engine system having an ERG apparatus according to an exemplary embodiment of the present invention.

As shown in FIG. 1 and FIG. 2, an engine system having an ERG apparatus (hereinafter referred to as an engine system) according to an exemplary embodiment of the present invention includes an engine 20, a turbocharger 70, an intercooler 16, an EGR (exhaust gas recirculation) apparatus 50, an operation information detector 80, and a controller 90.

The engine 20 includes a plurality of combustion chambers 21 generating a driving torque by combustion of a fuel. In the engine 20, an intake line 10 in which an intake gas supplied to the combustion chamber 21 flows and an exhaust line 30 in which an exhaust gas exhausted from the combustion chamber 21 flows are provided.

An exhaust gas purification device 60 purifying various harmful materials included in the exhaust gas exhausted from the combustion chamber 21 is provided in the exhaust line 30. The exhaust gas purification device 60 may include an Lean NOx Trap (LNT) for purifying nitrogen oxides, a diesel oxidation catalyst, and a diesel particulate filter.

The turbocharger 70 compresses an intake gas (external air+recirculation gas) inflowing through the intake line 10 to be supplied to the combustion chamber 21. The turbocharger 70 includes a turbine 71 provided in the exhaust line 30 and rotated by the exhaust gas exhausted from the combustion chamber 21, and a compressor 72 rotated in connection with the turbine 71 and compressing the intake gas.

The EGR apparatus 50 includes a recirculation line 52, an EGR cooler 56, and a flow rate controller 100.

The recirculation line 52 is branched from the exhaust line 30 of the rear stage of the turbocharger 70 and is joined to the intake line 10. The EGR cooler 56 is positioned at the recirculation line 52 and cools the exhaust gas flowing in the recirculation line 52. The flow rate controller 100 is mounted at the recirculation line 52 to control the amount of recirculation gas flowing in the recirculation line 52. Here, the exhaust gas supplied to the intake line 10 through the recirculation line 52 is referred to as recirculation gas.

Figure 3:
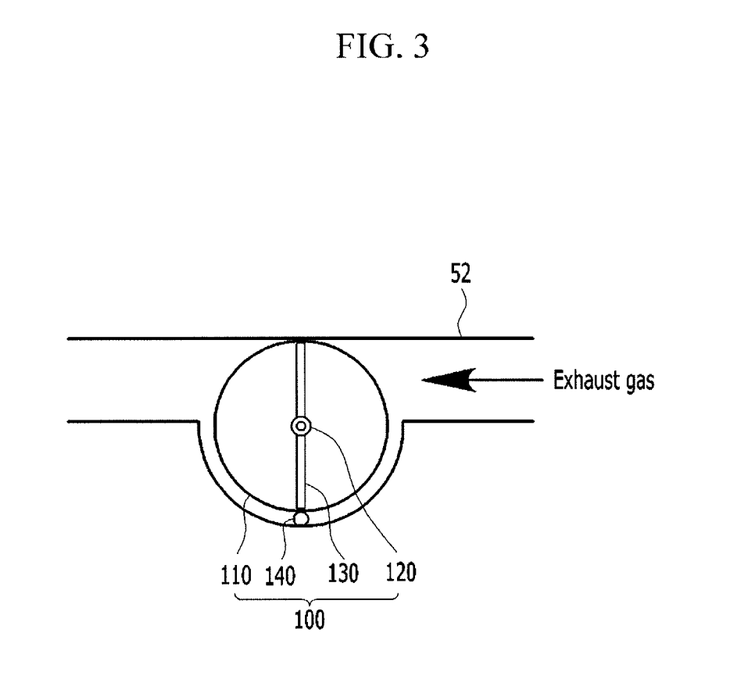
FIG. 3 is a top plan view showing a configuration of flow rate controller according to an exemplary embodiment of the present invention.

Referring to FIG. 3, the flow rate controller 100 includes a drive motor 110 generating power and a flap 130 mounted at a rotation axis 120 of the drive motor 110 and rotated by the recirculation gas flowing in the recirculation line 52 or rotated by power of the drive motor 110. In this case, the flow rate controller 100 may further include a speed sensor 140 detecting the rotation speed of the flap 130.

In this case, because the flap 130 is provided perpendicular to a flow direction of a recirculation gas flowing in the recirculation line and the rotation axis 120 of the drive motor 110 is positioned outside a radial direction of an interior circumference of the recirculation line, friction resistance of the flap 130 depending on the flow of the recirculation gas may be minimized and the amount of the recirculation gas may be correctly measured.

An amount of the recirculation gas flowing in the recirculation line may be measured from the rotation speed of the flap 130 measured through the speed sensor 140 and the pressure of the recirculation line measured through a later-described pressure sensor 58. In this case, the method of measuring the amount of recirculation gas from the rotation speed of the flap 130 and the pressure of the recirculation line is a same as a measurement principle through a disclosed flow amount system such that a detailed description is omitted.

As above-described, because the amount of the recirculation gas flowing in the recirculation line may be correctly measured from the rotation speed of the flap 130 and the pressure of the recirculation line, the amount of the recirculation gas and the EGR ratio may be correctly controlled. Since the EGR ratio may be increased to correctly measure the amount of the recirculation gas, the fuel consumption may be improved through the ignition timing advance.

Referring to FIG. 1 and FIG. 2, the intercooler 16 cools the intake gas inflowing through the intake line 10 through heat exchange with a coolant. That is, since the temperature of the intake gas compressed by the turbocharger 70 is increased such that the intake gas is expanded, oxygen density of the intake gas supplied to the combustion chamber 21 is decreased, thereby it is difficult to output the torque required of the engine 20. Accordingly, the intake gas is cooled through the intercooler 16 such that the density of the intake gas is increased, thereby improving the combustion efficiency of the engine 20.

The controller 90 controls the operations of the engine 20, the turbocharger 70, the EGR valve 54, and the flow rate controller 100.

For this, the controller 90 may be provided with at least one processor operated by a predetermined program, and the predetermined program may perform each step of the engine control method according to an exemplary embodiment of the present invention.

The operation information detector 80 senses operation information, and the detected operation information is transmitted to the controller 90. The operation information may include an intake temperature of the engine, a coolant temperature, a vehicle speed, and an engine load.

The controller 90 controls the operation of the flow rate controller 100 depending on the operation information detected in the operation information detector 80.

In detail, the controller 90 determines whether an operation region of the vehicle is a use region of the EGR apparatus from the operation information.

When the operation region is not the use region of the EGR apparatus 50, the controller 90 controls the flap 130 to be rotated in a direction opposite to the flow direction of the recirculation gas flowing in the recirculation line 52.

As described above, when the flap 130 is rotated in the direction opposite to the flow direction of the recirculation gas, the recirculation gas flowing in the recirculation line 52 does not inflow to the intake line 10. Accordingly, a separate EGR valve may be omitted and a manufacturing cost of the vehicle may be reduced.

The controller 90 controls the rotation speed of the flap 130 depending on a recirculation gas pressure measured through the pressure sensor 58.

On the other hand, when the operation region is the use region of the EGR apparatus 50, the controller 90 controls the flap 130 to be rotated in a same direction as the flow direction of the recirculation gas flowing in the recirculation line 52.

In this case, the controller 90 determines the amount of recirculation gas from the pressure of the recirculation gas measured by the pressure sensor 58 and the rotation speed of the flap 130 measured by the speed sensor 140, and controls the rotation speed of the flap 130 depending on the amount of the recirculation gas and a target EGR ratio. Here, the EGR ratio means a ratio that the amount of the recirculation gas inflowing to the engine through the exhaust gas recirculation system occupies among an entire air amount (fresh air+recirculation gas) inflowing to the engine.

For example, the controller controls the flap 130 to be rotated faster when the amount of recirculation gas is large, and controls the flap 130 to be rotated slower when the amount of recirculation gas is small. Also, the controller controls the flap 130 to be rotated faster when the target EGR ratio is high, and controls the flap 130 to be rotated slower when the target EGR ratio is low.

In general, the pressure of the external air inflowing through the intake line 10 is maintained with a level of an atmospheric pressure degree. Accordingly, the pressure difference of the front stage and the rear stage of the flow rate controller 100 may be detected through the pressure of the recirculation gas measured by the pressure sensor 58 mounted at the front stage of the flow rate controller 100.

Accordingly, the amount of recirculation gas supplied by the flow rate controller 100 may be controlled by only the recirculation gas pressure measured through the pressure sensor 58.

On the other hand, the engine system according to an exemplary embodiment of the present invention may further include a humidity sensor 59 mounted at the intake line 10. A humidity of the fresh air measured by the humidity sensor 59 is transmitted to the controller 90.

The controller 90 may compensate the EGR ratio depending on the humidity of the fresh air measured by the humidity sensor 59. For example, when the humidity of the fresh air measured by the humidity sensor 59 is more than a predetermined humidity, the EGR ratio may be decreased.

Hereinafter, the control method of the engine system of the present invention will be described with reference to accompanying drawings.

Figure 4:
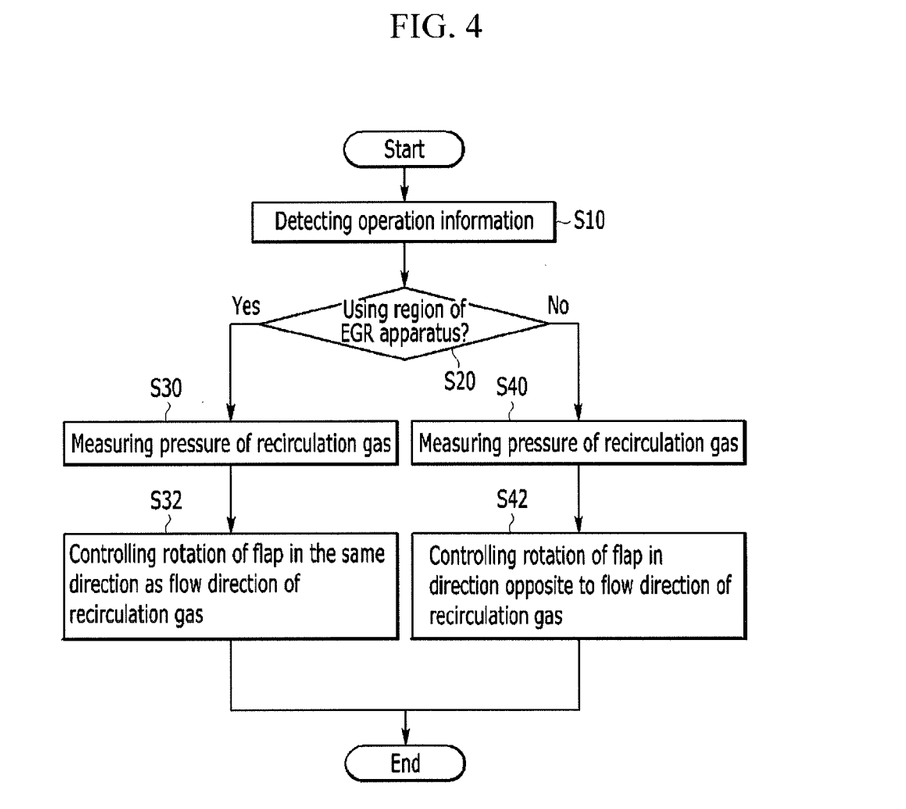
FIG. 4 is a flowchart showing a control method of an engine system having an ERG apparatus according to an exemplary embodiment of the present invention.

FIG. 4 is a flowchart showing a control method of an engine system having an ERG apparatus according to an exemplary embodiment of the present invention.

Referring to FIG. 4, the operation information detector 80 senses the operation information including the intake temperature, the coolant temperature, the vehicle speed, the engine speed, and the engine load of the engine (S10). The operation information detected in the operation information detector 80 is transmitted to the controller 90.

The controller 90 determines whether the operation region of the vehicle is the use region that the EGR apparatus is used from the operation information (S20). For example, in a case of a general gasoline engine, the EGR ratio depending on the engine speed (rpm) and the engine load is determined within a range that the engine speed is 1,000-4,000 rpm, and is previously stored in the controller 90 as a map data. That is, the controller 90 may determine whether the operation region is the use region of the EGR apparatus depending on the engine speed and the engine load.

The controller 90 controls an operation of the flow rate control. controller 100 depending on the use region of the EGR apparatus.

In detail, when the operation region of the vehicle is not the use region of the EGR apparatus, the pressure of the recirculation gas flowing in the recirculation line 52 is measured by the pressure sensor 58 and the rotation speed of the flap 130 is measured by the speed sensor 140 (S40), and the measured pressure of the recirculation gas and the measured rotation speed of the flap 130 are transmitted to the controller 90. The controller 90 determines the amount of recirculation gas from the pressure of the recirculation gas and the rotation speed of the flap 130.

The controller 90 applies power to the drive motor 110 of the flow rate controller 100 to control the flap 130 mounted at the rotation axis 120 of the drive motor 110 to be rotated in the direction opposite to the flow direction of the recirculation gas flowing in the recirculation line 52 (S42).

In this case, the controller 90 determines the amount of recirculation gas from the pressure of the recirculation gas measured by the pressure sensor 58 and the rotation speed of the flap 130 measured by the speed sensor 140 and controls the rotation speed of the flap 130 depending on the amount of recirculation gas and the target EGR ratio. For example, the controller 90 controls the flap 130 to be rotated faster when the amount of the recirculation gas is high and controls the flap 130 to be rotated slower when the amount of the recirculation gas is low.

As described above, when the operation region is not the use region of the EGR apparatus, as the flap 130 is controlled to be rotated in the opposite direction to the flow direction of the recirculation gas, the recirculation gas may be prevented from inflowing to the intake line 10 through the recirculation line 52. Accordingly, the EGR valve that is used in the conventional art may be eliminated, thereby reducing the manufacturing cost of the vehicle.

Meanwhile, in a step S20, when the operation region of the vehicle is the use region of the EGR apparatus, the pressure of the recirculation gas flowing in the recirculation line 52 is measured by the pressure sensor 58 (S30) and the measured pressure of the recirculation gas is transmitted to the controller 90.

The controller 90 applies the power to the drive motor 110 of the flow rate controller 100 to control the flap 130 mounted at the rotation axis 120 of the drive motor 110 to be rotated in a same direction as the flow direction of the recirculation gas flowing in the recirculation line 52 (S32).

In this case, the controller 90 determines the amount of recirculation gas, and the rotation speed of the flap 130 is controlled depending on the determined amount of recirculation gas and the target EGR ratio.

For example, the controller controls the flap 130 to be rotated faster when the target EGR ratio is higher than a predetermined amount and controls the flap 130 to be rotated slower if the target EGR ratio is lower than the predetermined amount.

Meanwhile, the controller 90 may compensate the EGR ratio depending on the humidity of the fresh air measured by the humidity sensor 59.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an engine system of an engine and an exhaust gas recirculation (EGR) apparatus re-supplying a part of exhaust gas exhausted from the engine to a combustion chamber of the engine, comprising:
   detecting operation information from an operation information detector;
   determining whether an operation region of a vehicle is a use region that the EGR apparatus is used from the operation information by a controller; and
   controlling, by the controller, operation of a flow rate controller of the EGR apparatus depending on the use region of the EGR apparatus,
   wherein when the operation region is the use region that the EGR apparatus is used,
   the controlling step includes:
   measuring a pressure of an exhaust gas flowing in a recirculation line by a pressure sensor provided in a recirculation line of the EGR apparatus;
   measuring a rotation speed of a flap mounted at a rotation axis of a drive motor of the flow rate controller by a speed sensor;
   determining an amount of recirculation gas from the pressure of the exhaust gas and the rotation speed of the flap by the controller; and
   controlling the flap to be rotated in a same direction as a flow direction of the exhaust gas flowing in the recirculation line depending on the amount of recirculation gas and the target EGR ratio by the controller.

2. The method of claim 1, wherein
   when the operation region is not the use region that the EGR apparatus is not used,
   the controlling includes:
   measuring the pressure of the exhaust gas flowing in the recirculation line by the pressure sensor provided to the recirculation line of the EGR apparatus;
   measuring the rotation speed of the flap mounted at the rotation axis of the drive motor of the flow rate controller by the speed sensor;
   determining the amount of the recirculation gas from the pressure of the exhaust gas and the rotation speed of the flap by the controller; and
   controlling the flap mounted at the rotation axis of the drive motor of the flow rate controller to be rotated in a direction opposite to the flow direction of the exhaust gas flowing in the recirculation line depending on the amount of the recirculation gas by the controller.

3. An engine system having an exhaust gas recirculation (EGR) apparatus, comprising:
   an engine including a plurality of combustion chambers generating a driving torque by combustion of a fuel;
   an intake line inflowing an intake gas supplied to the combustion chambers;
   an exhaust line flowing an exhaust gas exhausted from the combustion chambers;
   a turbocharger including a turbine provided at the exhaust line and rotated by the exhaust gas exhausted from the combustion chambers and a compressor provided at the intake line, rotated in connection with the turbine, and compressing external air; and
   the EGR apparatus including a recirculation line branched from the exhaust line and joined to the intake line, a flow rate controller mounted at the recirculation line and measuring and controlling an amount of recirculation gas, and a pressure sensor mounted at the recirculation line to measure a pressure of the recirculation gas,
   wherein the flow rate controller includes:
   a drive motor generating power;
   a flap mounted at a rotation axis of the drive motor and rotated by the recirculation gas flowing in the recirculation line or by a power of the drive motor; and
   a speed sensor detecting a rotation speed of the flap.

4. The engine system of claim 3, wherein
   the flap is provided perpendicular to a flow direction of the recirculation gas flowing in the recirculation line.

5. The engine system of claim 4, wherein
   the controller controls the flap to be rotated in a direction opposite to the flow direction of the recirculation gas flowing in the recirculation line when it is determined that an operation region is not a use region that the EGR apparatus is not used from the operation information.

6. The engine system of claim 4, wherein
   the controller determines an amount of the recirculation gas from the pressure of the recirculation gas measured by the pressure sensor and the rotation speed of the flap determined by the speed sensor and controls the flap to be rotated in a same direction as the flow direction of the recirculation gas flowing in the recirculation line depending on the determined amount of the recirculation gas and a target EGR ratio when it is determined that an operation region is a use region that the EGR apparatus is used from the operation information.

7. The engine system of claim 6, further including
   a humidity sensor measuring humidity of fresh air flowing in the intake line, and
   the controller is configured to compensate a rotation speed of the flap depending on the humidity of the air measured by the humidity sensor.

8. The engine system of claim 3, wherein
   the rotation axis of the drive motor is positioned outside a radial direction of an interior circumference of the recirculation line.

9. The engine system of claim 1, further including:
   an operation information detector detecting operation information of the vehicle; and
   a controller controlling the flow rate controller depending on the operation information.

* * * * *